United States Patent
Holtier et al.

Patent Number: 6,158,390
Date of Patent: Dec. 12, 2000

[54] PET BALL

[75] Inventors: Eugene S. Holtier, Olmstead Township; Michael J. Christescu, Seven Hills, both of Ohio

[73] Assignee: Our Pet's Company, Fairport Harbor, Ohio

[21] Appl. No.: 09/292,492

[22] Filed: Apr. 15, 1999

Related U.S. Application Data

[60] Provisional application No. 60/082,045, Apr. 16, 1998.

[51] Int. Cl.⁷ .................................................. A01K 29/00
[52] U.S. Cl. ........................................ 119/707; 119/702
[58] Field of Search ........................... 119/702, 707, 119/711, 708; D21/546, 204; 473/569, 594, 595; D30/160; 446/437; 273/DIG. 20

[56] References Cited

U.S. PATENT DOCUMENTS

| | | | |
|---|---|---|---|
| D. 214,928 | 8/1969 | Baldwin et al. | D21/546 |
| 848,136 | 3/1907 | Smith . | |
| 1,006,182 | 10/1911 | Cousin . | |
| 1,022,112 | 4/1912 | Smith . | |
| 1,031,095 | 7/1912 | Smith . | |
| 1,513,773 | 11/1924 | Thompson . | |
| 1,534,964 | 4/1925 | Kahnweiler . | |
| 2,086,631 | 7/1937 | Munro | 272/86 |
| 4,756,530 | 7/1988 | Karman | 273/113 |
| 5,009,193 | 4/1991 | Gordon | 119/29 |
| 5,265,559 | 11/1993 | Borell | 119/707 |
| 5,961,406 | 10/1999 | Hass | 473/576 |

*Primary Examiner*—Peter M. Poon
*Assistant Examiner*—Judith A. Nelson
*Attorney, Agent, or Firm*—Oldham & Oldham Co., L.P.A.

[57] ABSTRACT

A pet ball which is formed from two (2) hollow semi-spherical half members and which is readily mobile along a hard surface, for example the ground. A weight, for example, a fishing sinker, is suspended within the pet ball. The weight is suspended by an elastic member, for example, an elastic rubber band, which is attached to the inside wall of the pet ball. The weight can be attached to the elastic member in such a manner that it can move along the elastic member or it can be fixed at a stationary position along the elastic member to create different desired effects. When a force is applied to the pet ball, it will roll. With the weight being suspended from the elastic member, the center of gravity of the pet ball changes as the pet ball rolls, thus resulting in erratic movement or a path which follows no definite or consistent direction or pattern. Each of the hollow semi-spherical half members include a hook member extending inwardly from their inside walls for anchoring the elastic member, which is attached to each hook member to normally retain the two (2) hollow semi-spherical half members together in a spherical ball configuration, but permits the two (2) hollow semi-spherical half members to be pulled apart or separated.

18 Claims, 1 Drawing Sheet

PET BALL

This application claims benefit to U.S. provisional application Ser. No. 60/082,045 filed Apr. 16, 1998.

BACKGROUND AND SUMMARY OF THE INVENTION

The present invention relates generally to new and novel improvements in a pet ball. More particularly, the present invention relates to a pet ball for use and enjoyment by pets which is durable and lightweight, economical to fabricate, easy to assemble and provides pets with exercise and enjoyment. More specifically, the present invention is directed to a pet ball which is hollow and has a weight suspended within it. The weight suspended within the hollow pet ball in accordance with the present invention changes the momentum of the rolling hollow pet ball rapidly giving the hollow pet ball an erratic roll when a force is applied to it. The hollow pet ball and suspended weight in accordance with the present invention allows pets to play with the hollow pet ball and be entertained by using it.

Pets, such as cats, dogs, ferrets, rabbits, hamsters and others, which spend the majority of their time indoors are becoming increasingly popular. In addition, due to the increasingly busy schedules of their owners, such pets are spending an increasing amount of time alone indoors when their owners are not present. While having healthy and happy pets is an objective of virtually every pet owner, the ability of pet owners to exercise and play with their pets is sometimes limited due to a lack of time and energy on behalf of the pet owner.

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment. However, pets tend to quickly lose interest in such devices and thus, the pets do not benefit from exercise and enjoyment from such devices when they are not used by the pets. However, all of these known prior art products move in a predictable path. Accordingly, it is normally necessary for a human being to be present to play with the pet when the pet is playing with such known prior art devices. In contrast, the pet ball in accordance with the present invention wobbles as it rolls and changes direction after rolling a short distance, thus providing the pet with enjoyment and entertainment, as well as mental and physical stimulation. Therefore, pets tend to want to continue to play with the pet ball in accordance with the present invention and thus receive benefit from exercise and enjoyment from playing with the pet ball for longer and more frequent periods of time.

Accordingly, an object of the present invention is the provision of a pet ball which is durable and lightweight and which rolls erratically and unpredictably due to movement of a suspended weight.

Another object of the present invention is to provide a pet ball which is hollow and includes a weight suspended in the interior thereof to encourage pets to play with the pet ball for longer and more frequent periods of time.

Yet another object of the present invention is to provide a pet ball which can be used by pets individually, or in conjunction with a human being, which rolls in an irregular and inconsistent path and which allows pets to be entertained without the necessity of having a human being present to play with the pet.

These and other objects of the present invention are attained by a pet ball which is formed from two (2) hollow semi-spherical half members and which is readily mobile along a hard surface such as the ground. A weight, such as a fishing sinker, is suspended within the pet ball. The weight is suspended by an elastic member, such as an elastic rubber band, which is attached to the inside wall of the pet ball. The weight can be attached to the elastic member in such a manner that it can move along the elastic member or it can be fixed at a stationary position along the flexible element to create different desired effects. When a force is applied to the pet ball, it will roll. With the weight being suspended from the flexible element, the center of gravity of the pet ball changes as the pet ball rolls, thus resulting in erratic movement or a path which follows no definite or consistent direction or pattern. Each of the hollow semi-spherical half members preferably include a hook member extending inwardly from their inside walls for anchoring the elastic member, which is preferably attached to each hook member to normally retain the two (2) hollow semi-spherical half members together in a spherical ball configuration, but permits the two (2) hollow semi-spherical half members to be pulled apart or separated.

DETAILED DESCRIPTION OF THE DRAWINGS

Figure 1:
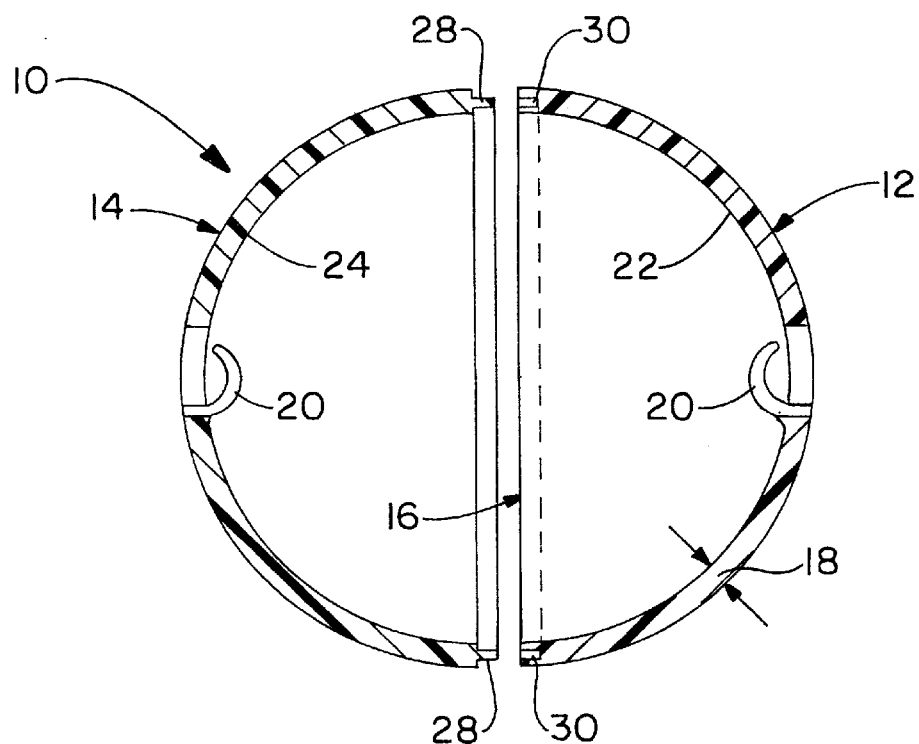
FIG. 1 is a cross-sectional side view of a pet ball in accordance with a preferred embodiment of the present invention with the two (2) hollow semi-spherical half members separated and with the elastic member and the suspended weight removed.
Figure 2:
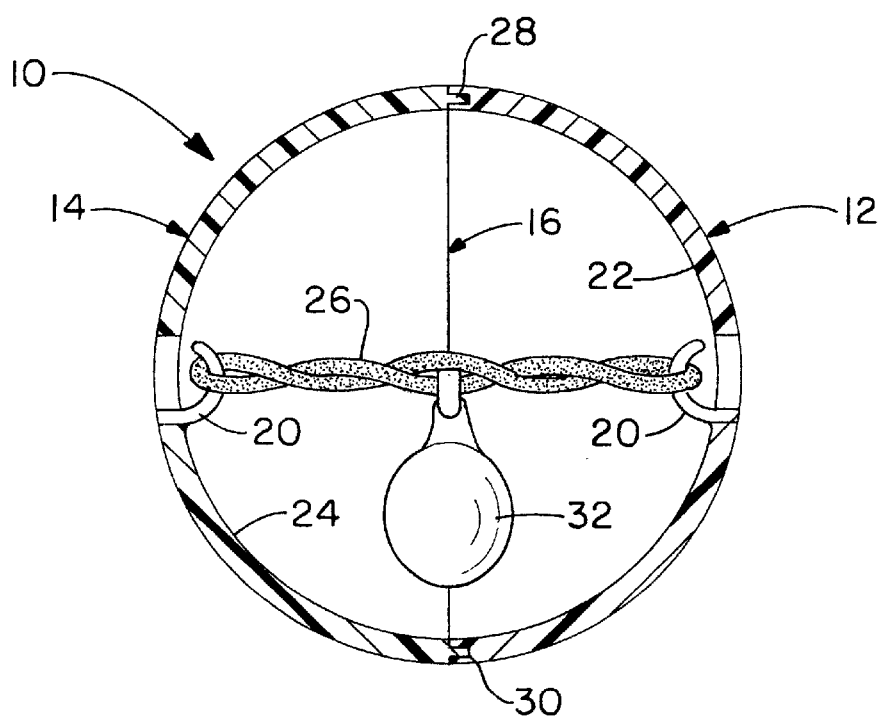
FIG. 2 is a cross-sectional side view of the preferred embodiment of the pet ball shown in FIG. 1 with the two (2) hollow semi-spherical half members being held together in a spherical configuration by the elastic member and the weight being suspended from the elastic member.

In the following detailed description of a preferred embodiment of the present invention, reference is made to the accompanying drawings which, in conjunction with this detailed description, illustrate and describe a preferred embodiment of a pet ball in accordance with the present invention. Referring now to the drawings, in which like-referenced characters represent corresponding elements throughout the several views, attention is first directed to FIG. 1 and FIG. 2, which illustrate a cross-sectional side view of a pet ball in accordance with a preferred embodiment of the present invention with the two (2) hollow semi-spherical half members separated and with the elastic member and the suspended weight removed and a cross-sectional side view of the preferred embodiment of the pet ball shown in FIG. 1 with the two (2) hollow semi-spherical half members being held together in a spherical configuration by the elastic member and the weight being suspended from the elastic member, respectively, pet ball in accordance with a preferred embodiment of the present invention is generally identified by reference number 10. Pet ball 10 generally consists of first hollow semi-spherical half member 12 and second hollow semi-spherical half member 14 brought together at seam 16. Pet ball 10 is intended for use by pets, such as cats, dogs, ferrets, rabbits and hamsters, and thus pet ball 10 is manufactured to withstand substantial force from such pets without breaking. This is preferably achieved by increasing wall thickness 18 and manufacturing first hollow semi-spherical half member 12 and second hollow semi-spherical half member 14 from a material that can withstand substantial forces such as polycarbonate, polyvinyl chloride, rubber or other plastic or polymer materials known in the art as accomplishing the purposes of the invention. Pet ball 10 can be manufactured in different diameters in a range of, for example, from one (1) inch to twelve (12) inches to accommodate the differences in size among pets. In addition, pet ball 10 can be made in a variety of colors, including clear, opaque and translucent colors. The preferred diameter of pet ball 10 to be used by cats, small dogs, ferrets and rabbits is approximately two (2) inches and pet ball 10 is preferably brightly colored to aid in its visibility to pets and humans alike.

Each of first hollow semi-spherical half member 12 and second hollow semi-spherical half member 14 includes hook member 20 extending inwardly from inside wall 22 and 24, respectively, for anchoring elastic member 26, such as a rubber band or some other elastic member that preferably does not have a significant memory. Elastic member 26 is attached to each hook member 20 which normally retains first hollow semi-spherical half member 12 and second hollow semi-spherical half member 14 in a spherical ball configuration. However, elastic member 26 is capable of being stretched, thus allowing first hollow semi-spherical half member 12 and second hollow semi-spherical half member 14 to be pulled apart or separated. Elastic member 26 preferably has a length such that there is little or no slack in an elastic member 26 when first hollow semi-spherical half member 12 and second hollow semi-spherical half member 14 are joined together at seam 16.

Hook members 20 can be either integrated integrally into first hollow semi-spherical half member 12 and second hollow semi-spherical half member 14 or can be separate parts which are affixed to first hollow semi-spherical half member 12 and second hollow semi-spherical half member 14 by, for example, an adhesive after first hollow semi-spherical half member 12 and second hollow semi-spherical half member 14 have been fabricated. As a possible alternative, first hollow semi-spherical half member 12 and second hollow semi-spherical half member 14 could include corresponding threads at seam 16 to allow first hollow semi-spherical half member 12 and second hollow semi-spherical half member 14 to be removably joined together by engaging the corresponding threads in first hollow semi-spherical half member 12 and second hollow semi-spherical half member 14 together into a spherical ball configuration without hook members 20 or elastic member 26.

As assembled, first hollow semi-spherical half member 12 and second hollow semi-spherical half member 14 are joined together at seam 16. Seam 16 may have a tongue 28 and groove 30 configuration, or, as other possible configurations, an overlap of outwardly extending projections present on first hollow semi-spherical half member 12 and second hollow semi-spherical half member 14, respectively, or a configuration which allows first hollow semi-spherical half member 12 and second hollow semi-spherical half member 14 to be snapped together by, for example, including a protrusion and a corresponding recess on an outwardly extending projection on, for example, first hollow semi-spherical half member 12 and an outwardly extending projection on, for example, second hollow semi-spherical half member 14, respectively.

Pet ball 10 also includes weight 32, such as, for example, a fishing sinker, which is suspended from flexible element 26. Weight 32 is preferably selected to correspond with the size of pet ball 10 in a ratio which is not so large that weight 32 cannot swing freely around elastic member 26 without inhibiting the ability of elastic member 26 to propel weight 32 after tension has been built up within elastic member 26 and not so small that weight 32 does not influence the movement of pet ball 10. Weight 32 can be attached to elastic member 26 by fixedly attaching weight 32 in a stationary position along the length of elastic member 26 or, alternatively, weight 32 can be attached to elastic member 26 such that weight 32 may move or slide along the length of elastic member 26 to cause a variety of desired effects to the movement of pet ball 10.

As assembled, first hollow semi-spherical half member 12 and second hollow semi-spherical half member 14 are attached together at seam 16. If desired, seam 16 can be sealed by, for example, using a suitable adhesive.

In use, pet ball 10 is rolled or thrown by the pet or by a human being. As pet ball 10 rolls, weight 32 winds around flexible element 26, thus transferring energy from weight 32 to flexible element 26. When flexible element 26 attains sufficient energy to create a force sufficient to propel weight 32, flexible element 26 unwinds and, as such, the momentum of weight 32 changes, causing pet ball 10 to move in a direction different from its original direction. In addition, weight 32 may cause pet ball 10 to wobble as it rolls, adding still further movement to pet ball 10.

Although the present invention has been described above in detail, the same is by way of illustration and example only and is not to be taken as a limitation on the present invention. For example, the pet ball in accordance with the present invention could be fabricated in other shapes, such as in a cube or an elongated football configuration and pet ball could be further modified in various ways. Accordingly, the scope and content of the present invention are to be defined only by the terms of the appended claims.

What is claimed is:

1. A pet ball, comprising a first hollow half member and a second hollow half member, said first hollow half member and said second hollow half member each include an inwardly extending hook portion upon which an elastic member is retained, said elastic member joins said first hollow half member and said second hollow half member together at a seam in a closed configuration and also allows said first hollow half member and said second hollow half member to be pulled apart or separated, and a weight is attached to said elastic member, said weight being sufficiently large to influence the rolling direction of said pet ball.

2. The pet ball in accordance with claim 1, wherein said first hollow half member and said second hollow half member are symmetrical.

3. The pet ball in accordance with claim 1, wherein said first hollow half member and said second hollow half member are fabricated from a brightly colored material.

4. The pet ball in accordance with claim 1, wherein said weight swings freely in the interior of said pet ball.

5. The pet ball in accordance with claim 1, wherein said weight is fixedly attached in a stationary position along the length of said elastic member.

6. The pet ball in accordance with claim 1, wherein said weight is attached to said elastic member in such a manner that said weight is permitted to move or slide along the length of said flexible element.

7. A pet ball, comprising a first hollow semi-spherical half member and a second hollow semi-spherical half member, said first hollow semi-spherical half member and said second hollw semi-spherical half member each include an inwardly extending hook portion upon which an elastic member is retained, said elastic member joins said first hollow semi-spherical half member and said second semi-spherical half member together at a seam in a closed configuration and also allows said first semi-spherical half member and said second semi-spherical half member to be pulled apart or separated, and a weight is attached to said elastic member, said weight being sufficiently large to influence the rolling direction of said pet ball.

8. The pet ball in accordance with claim 7, wherein said inwardly extending hook portions are integrally formed on said first hollow semi-spherical half member and said second hollow semi-spherical half member.

9. The pet ball in accordance with claim 7, wherein said inwardly extending hook portions are separate parts which are affixed to said first hollow semi-spherical half member and said second hollow semi-spherical half member by an adhesive.

10. The pet ball in accordance with claim 7, wherein one of said first hollow semi-spherical half member and said second hollow semi-spherical half member includes an outwardly extending tongue and the other of said first hollow semi-spherical half member and said second hollow semi-spherical half member includes a corresponding inwardly extending groove such said seam has a tongue and groove configuration.

11. The pet ball in accordance with claim 7, wherein said first hollow semi-spherical half member and said second hollow semi-spherical half member each include an outwardly extending projection and said outwardly extending projections of said first hollow semi-spherical half member and said second semi-spherical half member join at the said seam in an overlapped configuration.

12. The pet ball in accordance with claim 7, wherein one of said outwardly extending projections includes a protrusion and the other of said outwardly extending projections includes a corresponding recess to allow said first hollow semi-spherical half member and said second hollow semi-spherical half member to be snapped together.

13. The pet ball in accordance with claim 7, wherein said pet ball is in the range of from one (1) to twelve (12) inches in diameter.

14. The pet ball in accordance with claim 7, wherein said pet ball is approximately two (2) inches in diameter.

15. The pet ball in accordance with claim 7, wherein said weight swings freely in the interior of said pet ball.

16. The pet ball in accordance with claim 7, wherein said elastic member is a rubber band.

17. The pet ball in accordance with claim 7, wherein said weight is fixedly attached in a stationary position along the length of said elastic member.

18. The pet ball in accordance with claim 7, wherein said weight is attached to said elastic member in such a manner that said weight is permitted to move or slide along the length of said elastic member.

* * * * *